(12) United States Patent
Yanagawa

(10) Patent No.: US 10,027,838 B2
(45) Date of Patent: Jul. 17, 2018

(54) TERMINAL DEVICE CAPABLE OF EXECUTING WORKFLOW

(71) Applicant: BROTHER KOGYO KABUSHIKI KAISHA, Nagoya, Aichi (JP)

(72) Inventor: Ryo Yanagawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/468,930

(22) Filed: Mar. 24, 2017

(65) Prior Publication Data

US 2017/0289383 A1 Oct. 5, 2017

(30) Foreign Application Priority Data

Mar. 30, 2016 (JP) .................................. 2016-068931

(51) Int. Cl.
*H04N 1/00* (2006.01)
*G06F 8/61* (2018.01)

(52) U.S. Cl.
CPC ........... *H04N 1/00949* (2013.01); *G06F 8/61* (2013.01); *H04N 1/00204* (2013.01); *H04N 1/00973* (2013.01); *H04N 2201/0094* (2013.01)

(58) Field of Classification Search
None
See application file for complete search history.

(56) References Cited

U.S. PATENT DOCUMENTS

| 2005/0046887 A1* | 3/2005 | Shibata | H04N 1/00204 358/1.13 |
| 2009/0168091 A1* | 7/2009 | Fu | G06F 3/1204 358/1.15 |
| 2013/0201504 A1* | 8/2013 | Miller | G06F 3/1204 358/1.13 |

FOREIGN PATENT DOCUMENTS

JP 2015-508921 A 3/2015

* cited by examiner

*Primary Examiner* — Andrew H Lam
(74) *Attorney, Agent, or Firm* — Scully, Scott, Murphy & Presser, PC

(57) ABSTRACT

A terminal device includes a processor; and a memory. The memory stores a set of computer-readable instructions therein. The set of computer-readable instructions, when executed by the processor, causing the terminal device to perform: receiving workflow data from another terminal device different from the terminal device, the workflow data including communication information and process identification information, the communication information being used for communication with a target device different from the terminal device and the another terminal device and capable of executing a plurality of processes including a prescribed process, the process identification information identifying the prescribed process; receiving an execution command instructing execution of a workflow corresponding to the workflow data; and in response to the execution command, executing the workflow on the target device using the communication information and the process identification information included in the workflow data.

17 Claims, 13 Drawing Sheets

FIG. 7

| ACQUISITION PROCESS INFORMATION ||||
|---|---|---|---|
| COMMAND INFORMATION | SETTING CONDITION INFORMATION | DRIVER INFORMATION | RESTRICTION FLAG |
| SCAN | SCAN PARAMETER | REQUIRED | OFF |
| SELECT-FROM-LOCAL | INPUT PATH | NOT REQUIRED | – |
| SELECT-FROM-CLOUD | CLOUD INFORMATION | NOT REQUIRED | – |

FIG. 8

| OUTPUT PROCESS INFORMATION | | | |
|---|---|---|---|
| COMMAND INFORMATION | SETTING CONDITION INFORMATION | DRIVER INFORMATION | RESTRICTION FLAG |
| SAVE-TO-LOCAL | OUTPUT PATH | NOT REQUIRED | – |
| SAVE-TO-CLOUD | CLOUD INFORMATION | NOT REQUIRED | – |
| OPEN-MAILER | MAILER INFORMATION | NOT REQUIRED | – |
| PRINT | PRINT PARAMETER | REQUIRED | OFF |

TERMINAL DEVICE CAPABLE OF EXECUTING WORKFLOW

CROSS REFERENCE TO RELATED APPLICATION

This application claims priority from Japanese Patent Application No. 2016-068931 filed on Mar. 30, 2016. The entire content of the priority application is incorporated herein by reference.

TECHNICAL FIELD

The present disclosure relates to a non-transitory computer readable storage medium storing a control program for executing a workflow.

BACKGROUND

A terminal unit can implement functions for a workflow on a printer or other device by outputting an execution command to the device. According to the technology described in Japanese Patent Application Publication No. 2015-508921, an electronic device acquires a set of supported capabilities from a printer and, after the user of the device selects a supported function within the workflow, determines whether printer-specific software is required to execute the function. If the terminal unit determines that printer-specific software is required, the device downloads and installs the software.

SUMMARY

While the technology described above can implement supported functions in a workflow, the technology does not describe a process for recording the workflow in the electronic device. Further, although the terminal unit can record a workflow, the user of the terminal unit must normally perform various operations to do so. Thus, it would be desirable to facilitate the use of workflows. In view of the foregoing, it is an object of the present disclosure to provide a technology that facilitates the use of workflows.

In order to attain the above and other objects, one aspect provides a non-transitory computer readable storage medium storing a set of program instructions for a first terminal device. The set of program instructions, when executed by a computer provided in the first terminal device, causing the first terminal device to perform: receiving first workflow data from a second terminal device different from the first terminal device, the first workflow data including communication information and first process identification information, the communication information being used for communication with a target device different from the first terminal device and the second terminal device and capable of executing a plurality of processes including a first process, the first process identification information identifying the first process; receiving an execution command instructing execution of a workflow corresponding to the first workflow data; and in response to the execution command, executing the workflow on the target device using the communication information and the first process identification information included in the first workflow data.

According to another aspect, a workflow execution method for executing a workflow by a first terminal device is provided. The workflow corresponds to workflow data created by a second terminal device different from the first terminal device. The workflow execution method includes: transmitting the workflow data from the second terminal device to the first terminal device, the workflow data including communication information and process identification information, the communication information being used for communication with a target device different from the first terminal device and the second terminal device and capable of executing a plurality of processes including a prescribed process, the process identification information identifying the prescribed process; receiving the workflow data by the first terminal device; receiving an execution command instructing execution of the workflow by the first terminal device; and in response to the execution command, executing the workflow on the target device using the communication information and the process identification information included in the workflow data.

According to still another aspect, a terminal device includes: a processor; and a memory. The memory stores a set of computer-readable instructions therein. The set of computer-readable instructions, when executed by the processor, causing the terminal device to perform: receiving workflow data from another terminal device different from the terminal device, the workflow data including communication information and process identification information, the communication information being used for communication with a target device different from the terminal device and the another terminal device and capable of executing a plurality of processes including a prescribed process, the process identification information identifying the prescribed process; receiving an execution command instructing execution of a workflow corresponding to the workflow data; and in response to the execution command, executing the workflow on the target device using the communication information and the process identification information included in the workflow data.

BRIEF DESCRIPTION OF THE DRAWINGS

The particular features and advantages of the disclosure as well as other objects will become apparent from the following description taken in connection with the accompanying drawings, in which:

FIG. 7 shows an example of acquisition process information;

FIG. 8 shows an example of output process information;

DETAILED DESCRIPTION

<Structure of a Communication System>

Figure 1:
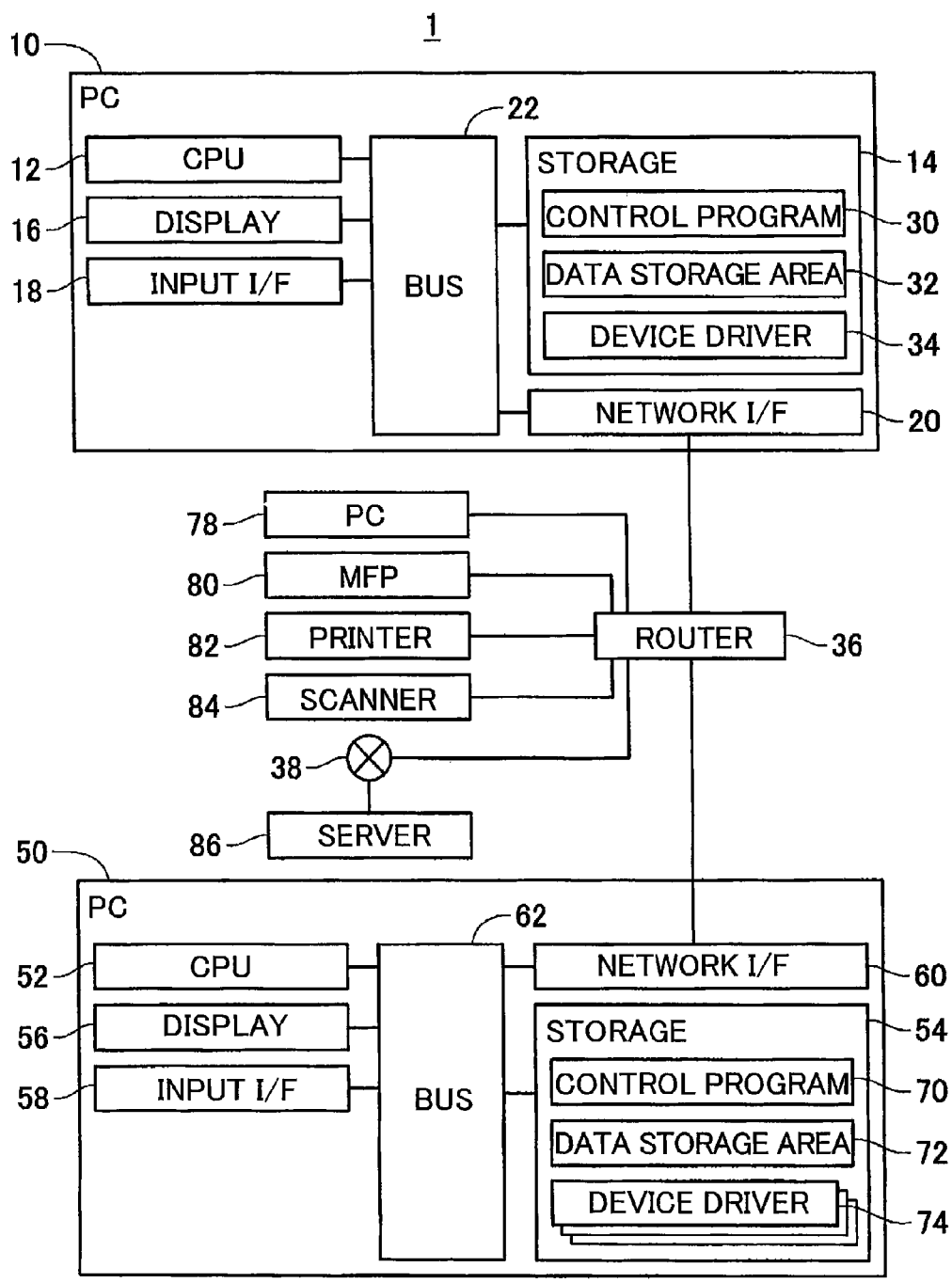
FIG. 1 shows a block diagram of a communication system serving as an embodiment of the present disclosure.

FIG. 1 shows a block diagram of a communication system 1 serving as an embodiment of the present disclosure. The communication system 1 includes a personal computer (PC) 10, a PC 50, a PC 78, a multifunction peripheral (MFP) 80, a printer 82, a scanner 84, and a server 86. The PC 10 is an example of the claimed first terminal device and terminal device, the PC 50 is an example of the claimed second terminal device and another terminal device, and the PC 78 is an example of the claimed third terminal device. The MFP 80, printer 82, and scanner 84 are examples of the claimed target device.

The PC 10 primarily includes a central processing unit (CPU) 12, storage 14, a display 16, an input interface 18, and a network interface 20. All components of the PC 10 are capable of communicating with each other via a bus 22. The CPU 12 is an example of the claimed computer and processor.

The CPU 12 executes processes based on a control program 30 stored in the storage 14. The control program 30 is an example of the claimed set of program instructions. The control program 30 instructs the CPU 12 to execute processes related to a workflow. In the following description, the action of the CPU 12 executing the control program 30 may be simply referred to by the program name. For example, the phrase "the control program 30" may be used to signify "the CPU 12 executing the control program 30." Here, the storage 14 is configured of a combination of storage memory that includes random access memory (RAM), read-only memory (ROM), flash memory, a hard disk drive (HDD), and a buffer provided in the CPU 12, for example.

The storage 14 also stores a device driver 34 for the printer 82. That is, the device driver 34 for the printer 82 is installed on the PC 10. However, device drivers are not installed for the MFP 80 and scanner 84. Here, device drivers for the MFP 80 and the like are device-specific software used by the PC 10 when implementing various processes with devices such as the MFP 80. The device driver 34 is an example of the claimed specific software. The storage 14 also includes a data storage area 32. The data storage area 32 serves to store data and the like required when executing the control program 30.

The display 16 displays various screens based on image data. The display 16 may be configured of, but is not limited to, a liquid crystal display (LCD) or an organic electroluminescent (EL) display. The input interface 18 includes a keyboard, mouse, and the like. The keyboard comprises keys for instructing the execution of functions possessed by the PC 10. The mouse controls a pointer (not shown) displayed on the display 16. The input interface 18 may be a touchscreen that is integrally configured with the display 16 and that accepts user operations at positions corresponding to icons and the like displayed on the display 16.

The network interface 20 communicates with external devices connected to a network, such as a wireless local area network (LAN) or a wired LAN. The network interface 20 is connected to the PC 50, PC 78, MFP 80, printer 82, and scanner 84 via a router 36. The router 36 is also connected to the server 86 via an internet 38. With this arrangement, the PC 10 can perform data communications with the PC 50, PC 78, MFP 80, printer 82, scanner 84, and server 86 via the network interface 20. In the present embodiment, the MFP 80 is a device that can perform printing processes and scanning processes. The printer 82 is a device capable of executing printing processes, and the scanner 84 is a device capable of executing scanning processes. The communication system 1 may also include a facsimile machine for executing faxing processes.

The PC 50 primarily includes a CPU 52, storage 54, a display 56, an input interface 58, and a network interface 60. These components can communicate with each other via a bus 62. Since the CPU 52, storage 54, display 56, input interface 58, and network interface 60 of the PC 50 have substantially the same structure as the CPU 12, storage 14, display 16, input interface 18, and network interface 20 of the PC 10, a detailed description of these components has been omitted. The storage 54 includes a data storage area 72 similar to the data storage area 32 of the storage 14 and stores a control program 70 and device drivers 74 for the MFP 80, printer 82, and scanner 84. In other words, a device driver 74 for each of the MFP 80, printer 82, and scanner 84 is installed on the PC 50. Further, the control program 30 and control program 70 are the same program and can execute the same processes.

The PC 78 has approximately the same components as the PC 10 described above and, hence, a detailed description of the PC 78 will not be provided.

<Executing Processes According to a Workflow>

The PC 50 is connected to various devices including the MFP 80, printer 82, and scanner 84 and can set up a workflow for each device. An icon associated with the workflow set up for each device is displayed on the display 56. By selecting one of the icons, the user can execute a process based on the corresponding workflow. Workflows set up on the PC 50 are also transmitted to the PC 10 and other devices so that various processes according to these workflows can be executed on the PC 10 and other devices. In the present embodiment, a workflow denotes a process flow in which an acquisition process for acquiring data to be processed and an output process for outputting data acquired in the acquisition process are executed in coordination with each other based on various preset conditions.

Figure 2:
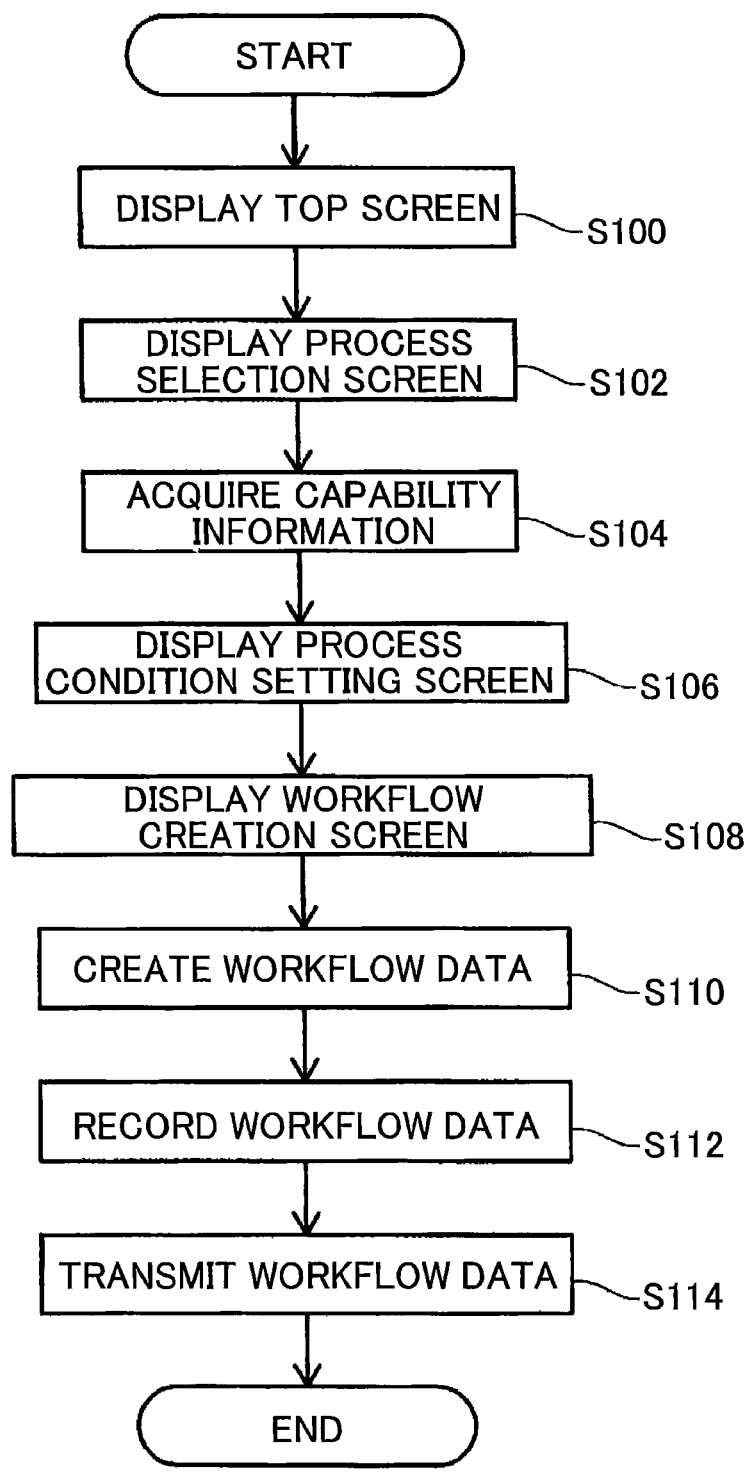
FIG. 2 is a flowchart illustrating steps in a process executed on a PC during creation of workflow data.

Specifically, when the control program 70 is executed on the PC 50, the CPU 52 executes the process flow shown in FIG. 2. In S100 of the process flow, the CPU 52 displays a top screen 100 shown in FIG. 3 on the display 56 of the PC 50. Included in the top screen 100 are a PRINT icon 102, a SCAN icon 104, a CREATE WORKFLOW button 106, and a SELECT DEVICE button 108.

The PRINT icon 102 is an operable icon for executing a printing process according to desired settings. When the user operates the PRINT icon 102, the CPU 52 displays a screen for selecting an image to be printed, a screen for configuring print settings, and the like on the display 56. After the user has performed selections, settings, and the like in the screens, the CPU 52 executes the desired printing process. The SCAN icon 104 is also an operation icon for executing a scanning process according to desired settings. When the user selects the SCAN icon 104, the CPU 52 displays a screen for configuring scan settings, a screen for selecting a destination for saving the scan data generated in the scanning process, and the like on the display 56. After the user performs all selections and settings in the screens, the CPU 52 executes the desired scanning process. The CREATE WORKFLOW button 106 is selected for creating a workflow described later.

The SELECT DEVICE button 108 is also an operable button for selecting a device to be used for executing the printing process or other processes. When the user selects the SELECT DEVICE button 108, the CPU 52 retrieves the one or more devices that are connected to the PC 50, i.e., the MFP 80, printer 82, and scanner 84, and displays a selection screen (not shown) on the display 56 for selecting one of the devices from the retrieved results. More specifically, in order to retrieve devices connected to the PC 50, the CPU 52 acquires IP addresses (as an example of the claimed communication information), model names (as an example of the claimed model identification information), and process information from each of the MFP 80, printer 82, and scanner 84 and stores the acquired information for each device in the data storage area 72.

Here, process information is information about processes that each device can execute. For example, process information acquired from the MFP 80 indicates that the MFP 80 can execute scanning processes and printing processes. After acquiring information for each device, the CPU 52 displays an image in the selection screen based on the acquired information. Once the user has selected a desired device in the selection screen, the CPU 52 sets the selected device as the active device.

After the user has selected a desired device in the selection screen, the CPU 52 re-displays the top screen 100 on the display 56. Now, the IP address and model name of the device selected in the selection screen (hereinafter simply called the "selected device") are displayed in the top screen 100 as information specifying the "ACTIVE DEVICE" illustrated in FIG. 3. If the user operates the CREATE WORKFLOW button 106 while a selected device is active, in S102 of FIG. 2 the CPU 52 displays a process selection screen 110 shown in FIG. 4 on the display 56. The process selection screen 110 is a screen for selecting a process set up as a workflow. When displaying the process selection screen 110, the CPU 52 identifies process information stored in the data storage area 72 in correspondence with the selected device and displays the process selection screen 110 based on the identified process information.

For example, if the MFP 80 has been set as the selected device, the process information stored in association with the MFP 80 indicates that the MFP 80 can execute scanning processes and printing processes. Consequently, icons for selecting both a printing process and a scanning process are displayed in a left-side region 112 of the process selection screen 110 as processes available with the selected device. If the user selects one of the icons in the left-side region 112, the CPU 52 displays additional icons in the right-side region 114 of the process selection screen 110 for further narrowing the definition of the process based on the icon selected in the left-side region 112.

For example, if the user selects the icon in the left-side region 112 of the process selection screen 110 representing the scanning process, the CPU 52 displays icons in the right-side region 114 of the process selection screen 110 for selecting a scanning process in which the scan data is saved on the PC 50 (hereinafter called a "Scan-to-PC process"), a scanning process in which the scan data is saved on the server 86 (hereinafter called a "Scan-to-Server process"), and a scanning process for transmitting the scan data by email (hereinafter called a "Scan-to-Email process"). Alternatively, if the user selects the icon in the left-side region 112 of the process selection screen 110 representing the printing process, the CPU 52 displays icons in the right-side region 114 of the process selection screen 110 for selecting a printing process based on image data stored on the PC 50 (hereinafter called a "Local Printing process"), and a printing process based on image data stored on the server 86 (hereinafter called a "Cloud Printing process").

When the user selects one of the icons in the right-side region 114 of the process selection screen 110, the CPU 52 sets the process corresponding to the selected icon as the workflow. For example, if the user selects the icon in the right-side region 114 of the process selection screen 110 corresponding to the Cloud Printing process, the CPU 52 sets the Cloud Printing process as the workflow. At this time, the CPU 52 stores the process selected in the process selection screen 110 in association with the IP address of the selected device as information for identifying the process set as the workflow (hereinafter called "workflow process identification information" which is an example of the claimed process identification information). Note also that the icons selected in the left-side region 112 and right-side region 114 of the process selection screen 110 are highlighted in the display. Thus, in the example of FIG. 4, the Scan-to-PC process has been selected in the process selection screen 110.

Next, when the user operates a SELECT button 116 after selecting desired icons in the left-side region 112 and right-side region 114 of the process selection screen 110, i.e., after selecting a process in the process selection screen 110 to be set as the workflow, in S104 the CPU 52 acquires capability information (as an example of the claimed capability information) from the selected device indicating capabilities of the selected device for executing the selected process. After acquiring the capability information, the CPU 52 correlates this capability information with the IP address of the selected device, the model name of the selected device, and the process information for the selected device and stores this correlated information in the data storage area 72 as the device information.

As an example, when the user has selected the scanning process in the process selection screen 110, the specific capability information acquired from the selected device may be information indicating the size of originals that can be read, whether color scanning is possible, whether duplex scanning is possible, and the possible scanning resolutions. Alternatively, if the printing process has been selected in the process selection screen 110, the capability information acquired from the selected device may include information indicating the possible sizes of paper that can be printed, the types of paper that can be printed, whether color printing is possible, the possible printing qualities, whether borderless printing is possible, whether duplex printing is possible, the possible printing layouts, and the possible printing resolutions.

Figure 5:
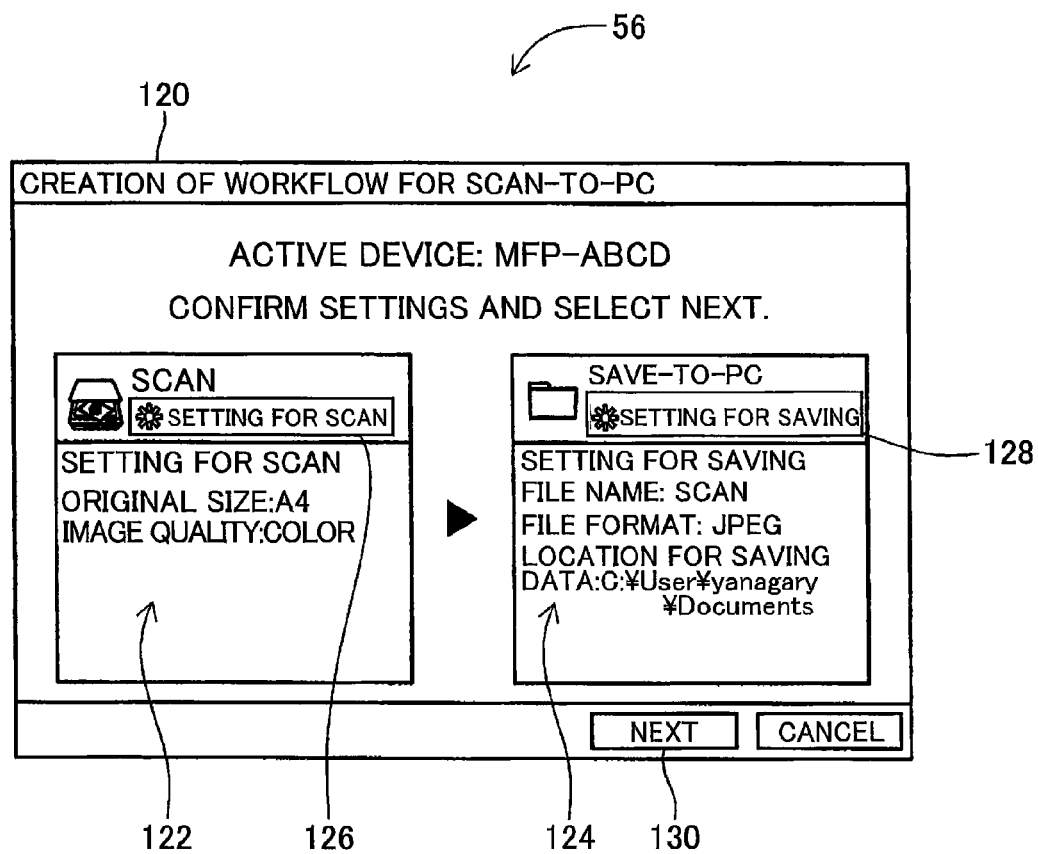
FIG. 5 shows an example of a process condition setting screen displayed on the display of the PC.

After acquiring the capability information in S104, in S106 the CPU 52 displays a process condition setting screen 120 shown in FIG. 5 on the display 56. The process condition setting screen 120 enables the user to set required conditions for executing the process selected in the process selection screen 110. Displayed in the process condition setting screen 120 are a first setting field 122, and a second setting field 124. The first setting field 122 is a field for setting required conditions for executing an acquisition process to acquire target data to be processed in the workflow.

For example, if the scanning process was selected in the process selection screen 110, the first setting field 122 displayed by the CPU 52 is a field for setting scanning conditions, i.e., a field for setting conditions required for executing a scanning process in order to acquire scan data as target data. If the Local Printing process was selected in the process selection screen 110, the first setting field 122 displayed by the CPU 52 is a field for setting the file path and the like in the PC 50 storing the target image data, i.e., a field for setting conditions required to execute a process for acquiring target image data from the PC 50 as the data to be processed. When the Cloud Printing process was selected in the process selection screen 110, the first setting field 122 displayed by the CPU 52 is a field for setting the domain and the like of a server storing the target image data, i.e., a field for setting conditions required to execute a process for acquiring the target image data from the server 86 as the data being processed.

The second setting field 124 is a field for setting required conditions for executing an output process to output data acquired during the workflow. For example, if the Scan-to-PC process was selected in the process selection screen 110, the second setting field 124 displayed by the CPU 52 is a field for setting the file path (as an example of the claimed area identification information) and the like for a specified file on the PC 50 as the destination for saving the scan data, i.e., a field for setting required conditions for executing a process to store scan data acquired in the scanning process on the PC 50. When the Scan-to-Server process was selected in the process selection screen 110, the second setting field 124 displayed by the CPU 52 is a field for setting the domain and the like of the server 86 as the destination for saving scan data, i.e., a field for setting required conditions for executing a process to store scan data acquired in a scanning process on the server 86. When the Scan-to-Email process was selected in the process selection screen 110, the second setting field 124 displayed by the CPU 52 is a field for setting a destination address and the like, i.e., a field for setting required conditions for executing a process to transmit scan data acquired in the scanning process via email. When the printing process was selected in the process selection screen 110, the second setting field 124 displayed by the CPU 52 is a field for setting printing conditions, i.e., required conditions for executing a process to output image data acquired for printing on printing paper (a printing process).

Note that the first setting field 122 displayed in the sample process condition setting screen 120 in FIG. 5 is a field for setting scanning conditions, while the second setting field 124 is a field for setting the file path and the like for a specified file on the PC 50 as the destination for saving scan data. That is, the process condition setting screen 120 shown in FIG. 5 is displayed on the display 56 when the user operates the Select button 116 after selecting the Scan-to-PC process in the process selection screen 110.

The process condition setting screen 120 also includes a first setting button 126 displayed in the first setting field 122, a second setting button 128 displayed in the second setting field 124, and a NEXT button 130. If the user operates the first setting button 126, a screen (not shown) for performing advanced settings in the first setting field 122 is displayed on the display 56, and selections made in this screen are displayed in the first setting field 122. If the user operates the second setting button 128, a screen (not shown) for performing advanced settings in the second setting field 124 is displayed on the display 56, and selections made in this screen are displayed in the second setting field 124.

Thus, if the user operates the first setting button 126 or the second setting button 128 while a field for setting scanning conditions or for setting printing conditions is displayed as the first setting field 122 or the second setting field 124, a screen for performing advanced settings of scanning conditions or printing conditions is displayed on the display 56. This screen is created based on the capability information acquired from the selected device and enables the user to set scanning conditions or printing conditions within the range of capabilities specified in the selected device's capability information. Thus, the user can only set scanning conditions or printing conditions that the selected device is capable of executing.

Figure 6:
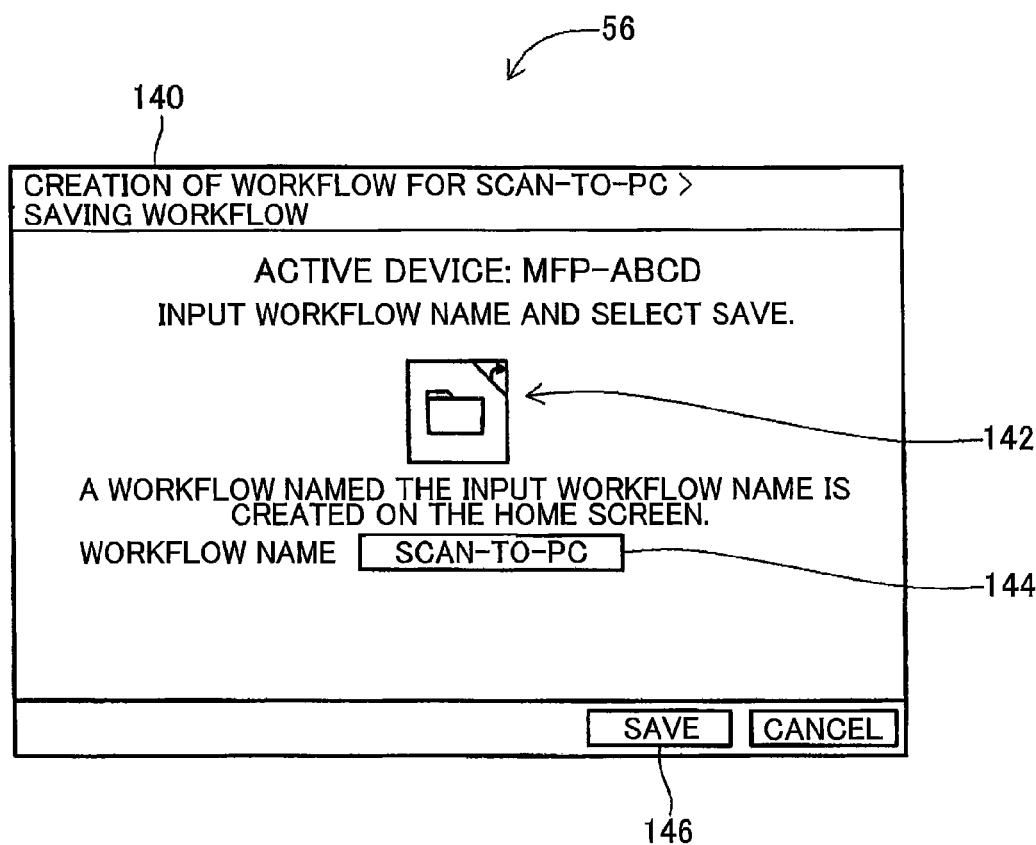
FIG. 6 shows an example of a workflow creation screen displayed on the display of the PC.

When the user operates the NEXT button 130 after setting various conditions in the first setting field 122 and second setting field 124, in S108 the CPU 52 displays a workflow creation screen 140 shown in FIG. 6 on the display 56. Displayed in the workflow creation screen 140 are an icon image 142, a workflow name entry field 144, and a SAVE button 146. The icon image 142 is an image of the icon that will be operated to execute a scanning process according to the created workflow. This icon will be described later. The workflow name entry field 144 is a field for inputting a name to be displayed in association with the icon corresponding to the icon image 142. Hence, when the Scan-to-PC process is set as the workflow, for example, "SCAN-TO-PC" is entered in the workflow name entry field 144 as the workflow name, as shown in FIG. 6.

When the user operates the SAVE button 146 in the workflow creation screen 140, in S110 the CPU 52 creates workflow data based on the information inputted into the workflow creation screen 140. Specifically, the CPU 52 creates acquisition process information based on the conditions set in the first setting field 122 of the process condition setting screen 120, and output process information based on conditions set in the second setting field 124 of the process condition setting screen 120.

The acquisition process information specifies conditions required for executing an acquisition process to acquire target data to be processed when executing the workflow. As shown in FIG. 7, the acquisition process information includes command information and setting condition information (as an example of the claimed setting information). The command information included in the acquisition process information specifies commands for executing an acquisition process, while the setting condition information specifies setting conditions for the acquisition process.

Specifically, when the scanning process is set as the workflow process identification information, the CPU 52 creates acquisition process information that includes "SCAN" as command information and "SCAN PARAMETER" as setting condition information. Here, "SCAN PARAMETER" specifies scanning conditions. Further, when the Local Printing process is set as the workflow process identification information, the CPU 52 creates acquisition process information that includes "SELECT-FROM-LOCAL" as command information and "INPUT PATH" as setting condition information. Here, "INPUT PATH" indicates a file path and the like for a specific file on the PC 50. Further, when the Cloud Printing process has been set as the workflow process identification information, the CPU 52 creates acquisition process information that includes "SELECT-FROM-CLOUD" as command information, and "CLOUD INFORMATION" as setting condition information. Here, "CLOUD INFORMATION" indicates the domain and the like of the server 86.

Output process information specifies required conditions for executing an output process to output data acquired during execution of the workflow. As shown in FIG. 8, the output process information includes command information and setting condition information (as an example of the claimed setting information). The command information in the output process information indicates commands used when executing an output process, while the setting condition information specifies setting conditions for the output process.

For example, when the Scan-to-PC process was set as the workflow process identification information, the CPU 52 creates output process information that includes "SAVE-TO-LOCAL" as command information, and "OUTPUT PATH" as the setting condition information. Here, "OUTPUT PATH" specifies a file path or the like for a specific file on the PC 50. When the Scan-to-Server process was set as the workflow process identification information, the CPU 52 creates output process information that includes "SAVE-TO-CLOUD" as command information, and "CLOUD INFORMATION" as setting condition information. Here, "CLOUD INFORMATION" specifies the domain and the like of the server 86. Further, when the Scan-to-Email process was set as the workflow process identification information, the CPU 52 creates output process information that includes "OPEN MAILER" as the command information, and "MAILER INFORMATION" as the setting condition information. Here, "MAILER INFORMATION" specifies the destination address or the like. Further, when the printing process was set as the workflow process identification information, the CPU 52 creates output process information that includes "PRINT" as command information, and "PRINT PARAMETER" as setting condition information. Here, "PRINT PARAMETER" specifies the printing conditions.

Note that the acquisition process information and output process information also include driver information and restriction flags, as illustrated in FIGS. 7 and 8. The driver information specifies whether a device driver is required for executing the acquisition process to acquire target data when executing the workflow or for executing the output process for outputting data acquired during execution of the workflow. Hence, in the present embodiment, the driver information in the acquisition process information is only set to "REQUIRED" when the command information is "SCAN" or "PRINT."

The restriction flag specifies whether installation of a device driver is restricted. Thus, in the present embodiment the restriction flag is only included in acquisition process information or output process information whose command information is set to "SCAN" or "PRINT." The restriction flag indicates that installation of a device driver is restricted when set to ON and is not restricted when set to OFF. Note that the restriction flag may also be arbitrarily turned on or off according to prescribed user operations.

After creating the acquisition process information and output process information as described above, the CPU 52 creates workflow data that includes this acquisition process information and output process information, as well as the device information and workflow process identification information stored previously in the data storage area 72. In S112 the CPU 52 records this workflow data in the data storage area 72. In S114 the CPU 52 transmits the workflow data to the PC 10. The present embodiment assumes that the user of the PC 50 has set the PC 10 as the destination for workflow data in a destination selection screen (not shown). The process of FIG. 2 ends after the workflow data has been transmitted.

The next time the top screen 100 is displayed on the display 56 after workflow data has been recorded in the data storage area 72, the CPU 52 displays an icon corresponding to the workflow data in the data storage area 72 (hereinafter called a "workflow execution icon") in the top screen 100 together with the Print icon 102 and Scan icon 104. By selecting this workflow execution icon, the user can execute a workflow corresponding to the workflow data. Execution of a workflow is described later in greater detail.

Figure 9:
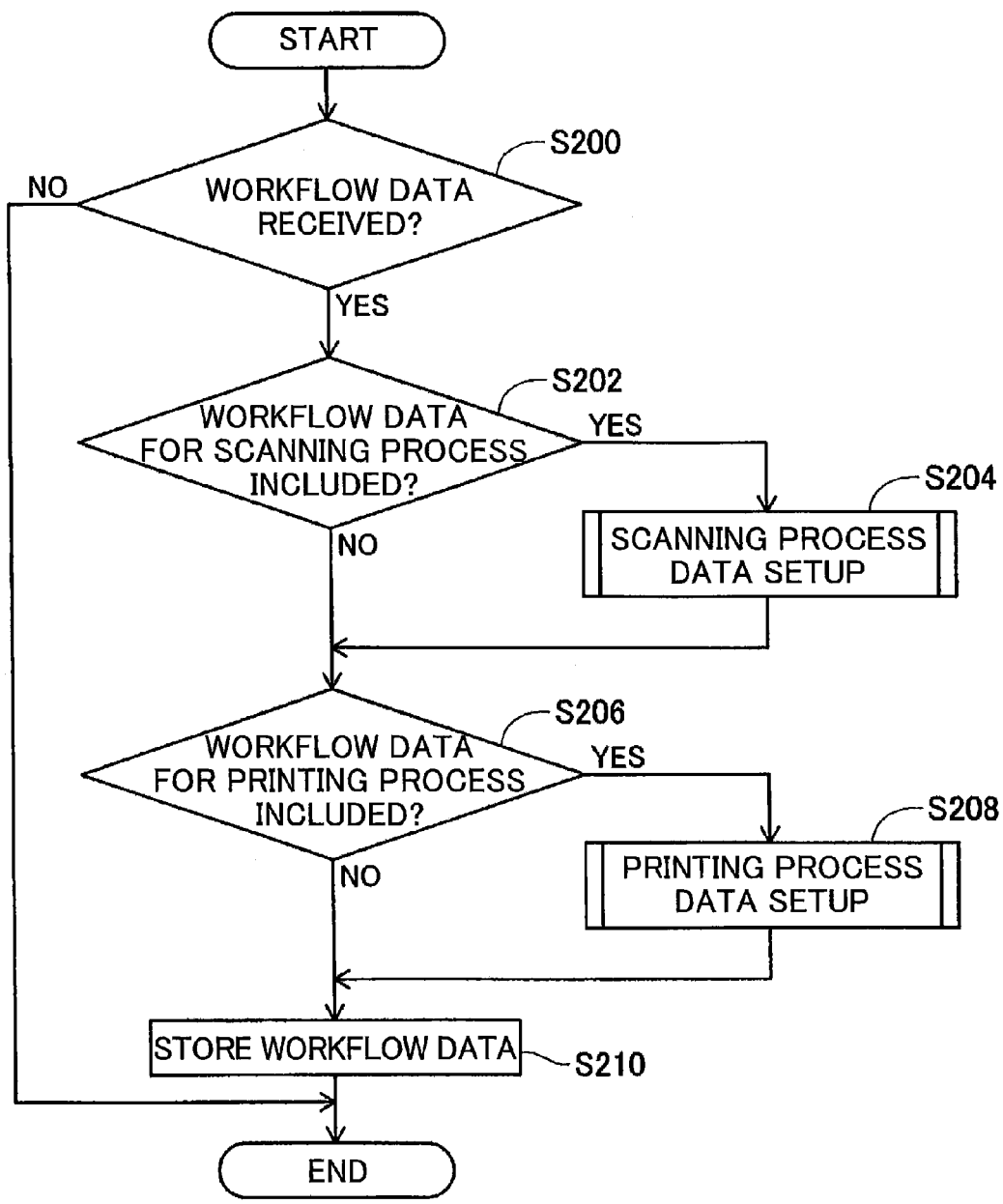
FIG. 9 is a flowchart illustrating steps in a process executed on a PC upon receipt of workflow data.

Further, when the control program 30 is executed on the PC 10 after the PC 10 has received workflow data from the PC 50, the control program 30 executes the process illustrated by the flowchart shown in FIG. 9. In S200 at the beginning of this process, the CPU 12 determines whether workflow data (as an example of the claimed first workflow data and workflow data) was received. In other words, the CPU 12 determines whether workflow data was created on the PC 50 and transmitted to the PC 10, as described above. If workflow data has not been received at this time (S200: NO), the CPU 12 ends the process of FIG. 9.

However, when workflow data has been received (S200: YES), in S202 the CPU 12 determines whether the received workflow data includes workflow data for the scanning process. In other words, the CPU 12 determines whether the process identified by the workflow process identification information that is included in the workflow data is the scanning process. If the workflow data includes workflow data for a scanning process (S202: YES), in S204 the CPU 12 executes a scanning process data setup subroutine.

Figure 10:
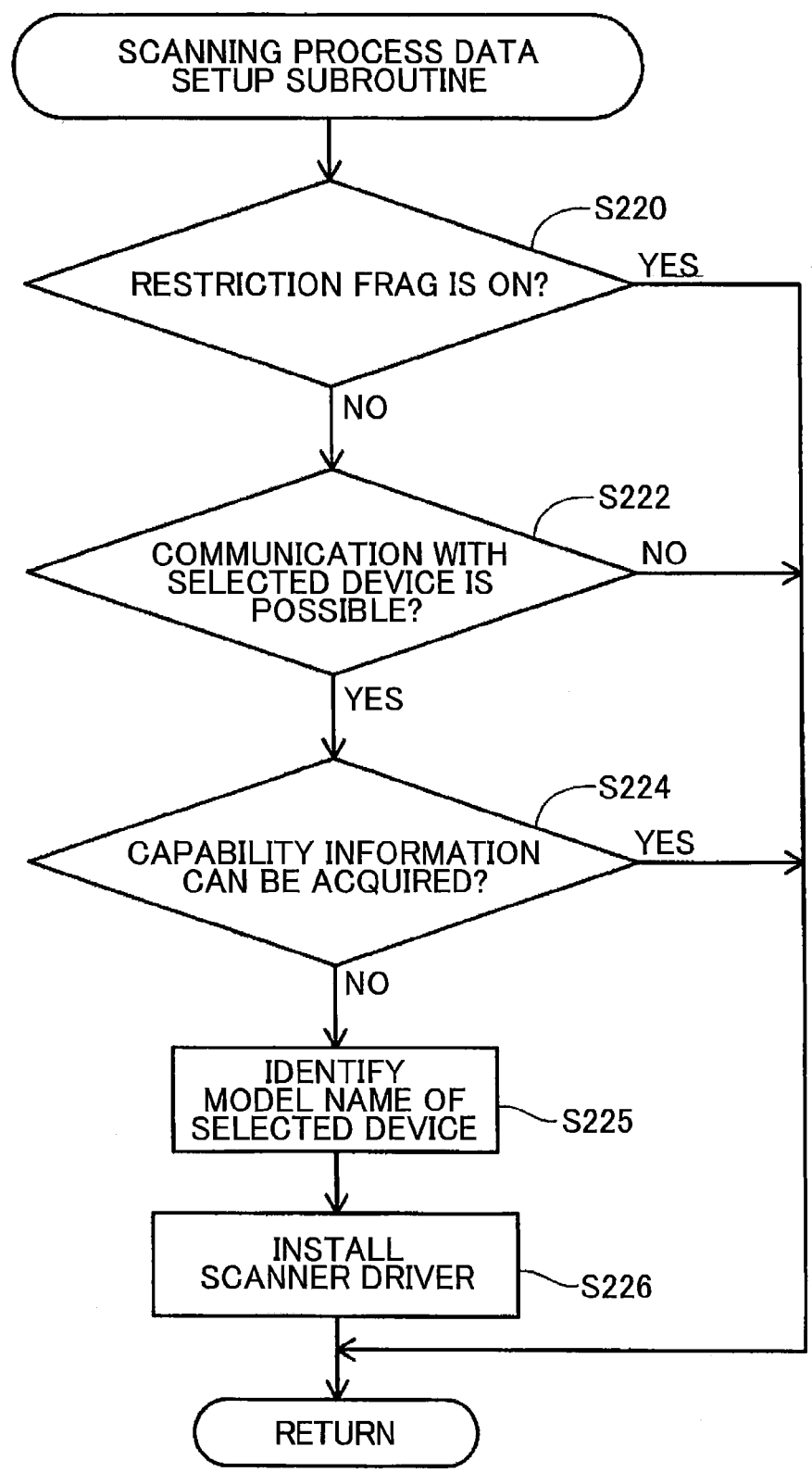
FIG. 10 is a flowchart illustrating steps in a scanning process data setup subroutine included in the flowchart illustrated in FIG. 9.

In the scanning process data setup subroutine shown in FIG. 10, in S220 the CPU 12 determines whether the restriction flag included in the workflow data is set to ON. If the restriction flag is set to ON (S220: YES), i.e., when the PC 10 is restricted from installing a device driver, the CPU 12 ends the scanning process data setup subroutine. However, if the restriction flag is set to OFF (S220: NO), i.e., when the PC 10 is not restricted from installing a device driver, in S222 the CPU 12 determines whether the PC 10 can communicate with the selected device. That is, the CPU 12 identifies the IP address in the device information included in the workflow data and determines whether it is possible to communicate with the device at that IP address.

If the CPU 12 is unable to communicate with the selected device (S222: NO), the CPU 12 ends the scanning process data setup subroutine. However, when the CPU 12 can communicate with the selected device (S222: YES), in S224 the CPU 12 determines whether the CPU 12 can acquire capability information from the selected device. A device driver for the selected device must be used in order to acquire capability information from the device. In other words, devices that do not have an installed device driver for the selected device cannot acquire capability information from the selected device. Since the device driver 34 for the printer 82 has been installed on the PC 10 in the present embodiment, the CPU 12 can acquire capability information from the selected device only when the selected device is the printer 82. Device drivers for the MFP 80 and the scanner 84 have not been installed on the PC 10. Therefore, the CPU 12 cannot acquire capability information from the selected device when the selected device is the MFP 80 or scanner 84.

When the CPU 12 can acquire capability information from the selected device (S224: YES), i.e., when the device driver for the selected device has been installed on the PC 10, the CPU 12 ends the scanning process data setup subroutine. However, if the CPU 12 cannot acquire capability information from the selected device (S224: NO), i.e., when a device driver for the selected device has not been installed on the PC 10, the CPU 12 performs a process to install a scanner driver. Specifically, in S225 the CPU 12 identifies the model name in the device information included in the workflow data. Using this model name, in S226 the CPU 12 acquires a device driver corresponding to the model name from an arbitrary website and installs the driver on the PC 10. In this example, the CPU 12 installs a device driver for the MFP 80 when the MFP 80 is the selected device and installs a device driver for the scanner 84 when the scanner 84 is the selected device. Subsequently, the CPU 12 ends the scanning process data setup subroutine.

After ending the scanning process data setup subroutine or when the CPU 12 determines in S202 that the workflow data does not include workflow data for a scanning process (S202: NO), in S206 the CPU 12 determines whether the workflow data includes workflow data for a printing process. If the workflow data includes workflow data for a printing process (S206: YES), in S208 the CPU 12 executes a printing process data setup subroutine.

Figure 11:
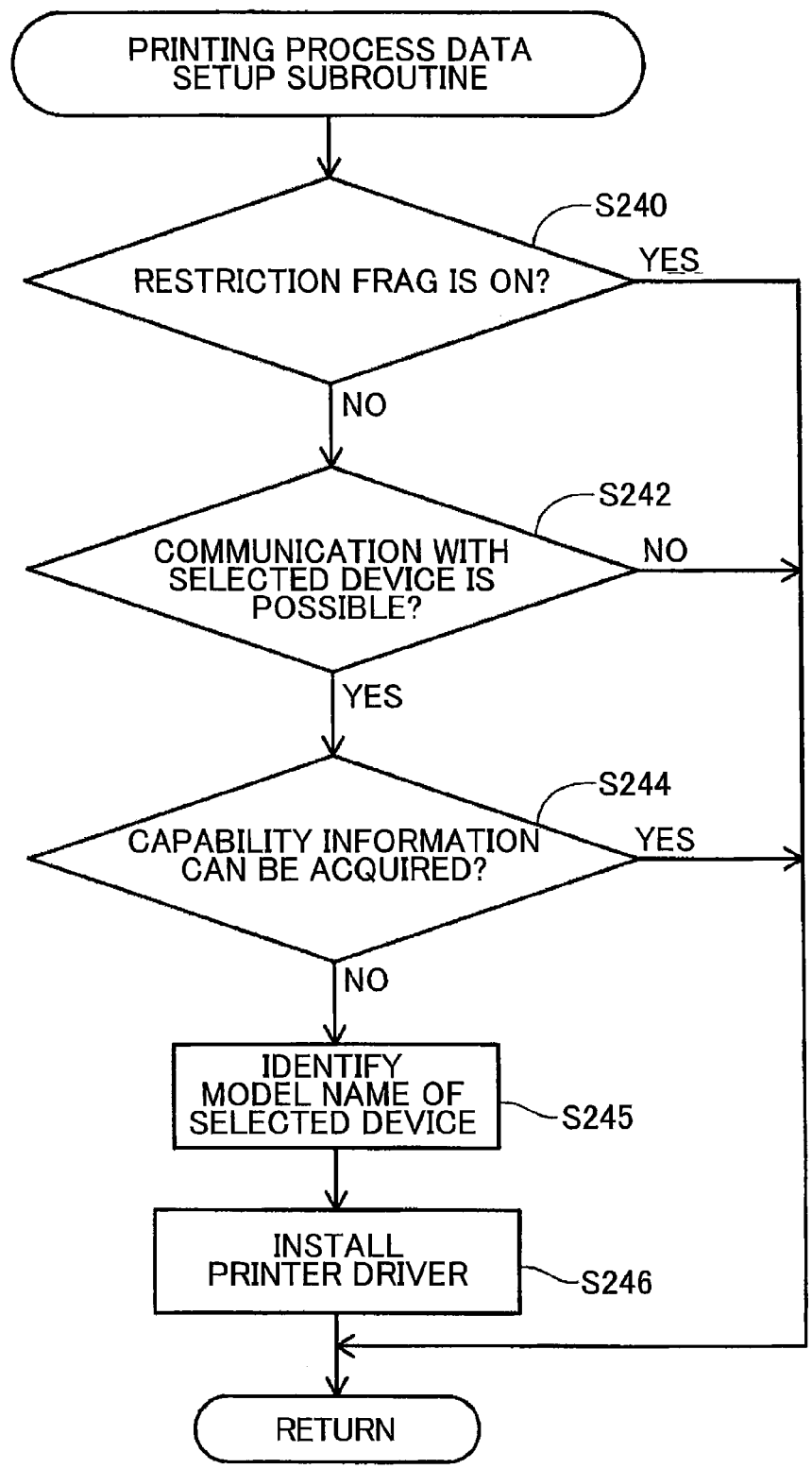
FIG. 11 is a flowchart illustrating steps in a printing process data setup subroutine included in the flowchart illustrated in FIG. 9.

In the printing process data setup subroutine shown in FIG. 11, in S240 the CPU 12 determines whether the restriction flag included in the workflow data is set to ON. If the restriction flag is set to ON (S240: YES), i.e., when the PC 10 is restricted from installing a device driver, the CPU 12 ends the printing process data setup subroutine. However, if the restriction flag is set to OFF (S240: NO), i.e., when the PC 10 is not restricted from installing a device driver, in S242 the CPU 12 determines whether the CPU 12 can communicate with the selected device.

If the CPU 12 cannot communicate with the selected device (S242: NO), the CPU 12 ends the printing process data setup subroutine. However, when the CPU 12 can communicate with the selected device (S242: YES), in S244 the CPU 12 determines whether the CPU 12 can acquire capability information from the selected device. When the CPU 12 can acquire capability information from the selected device at this time (S244: YES), i.e., when the device driver for the selected device is installed on the PC 10, the CPU 12 ends the printing process data setup subroutine. However, when the CPU 12 cannot acquire capability information from the selected device (S244: NO), i.e., when the device driver for the selected device has not been installed on the PC 10, in S245 the CPU 12 identifies the model name in the device information included with the workflow data. In S246 the CPU 12 acquires the device driver associated with the model name and installs the driver. Subsequently, the CPU 12 ends the printing process data setup subroutine.

After ending the printing process data setup subroutine or when the CPU 12 determines in S206 of FIG. 9 that the workflow data does not include workflow data for a printing process (S206: NO), in S210 the CPU 12 stores the workflow data in the data storage area 32. Subsequently, the CPU 12 ends the process of FIG. 9.

Figure 3:
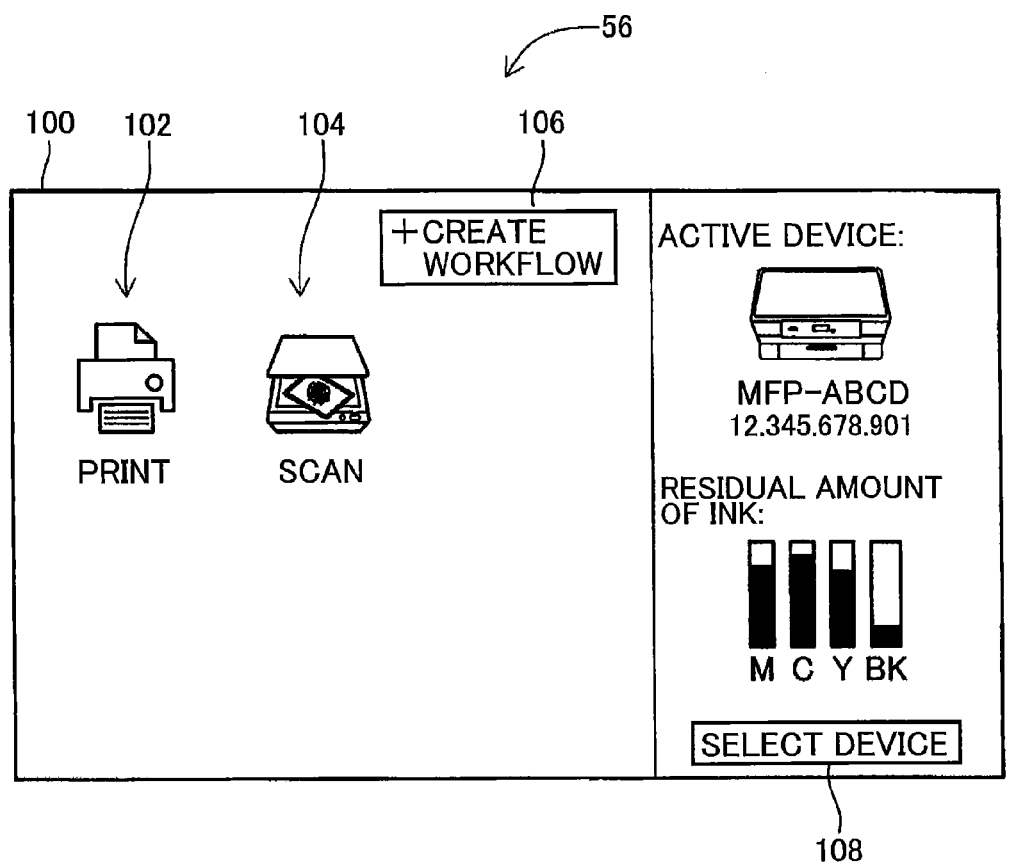
FIG. 3 shows an example of a top screen displayed on a display of the PC.
Figure 4:
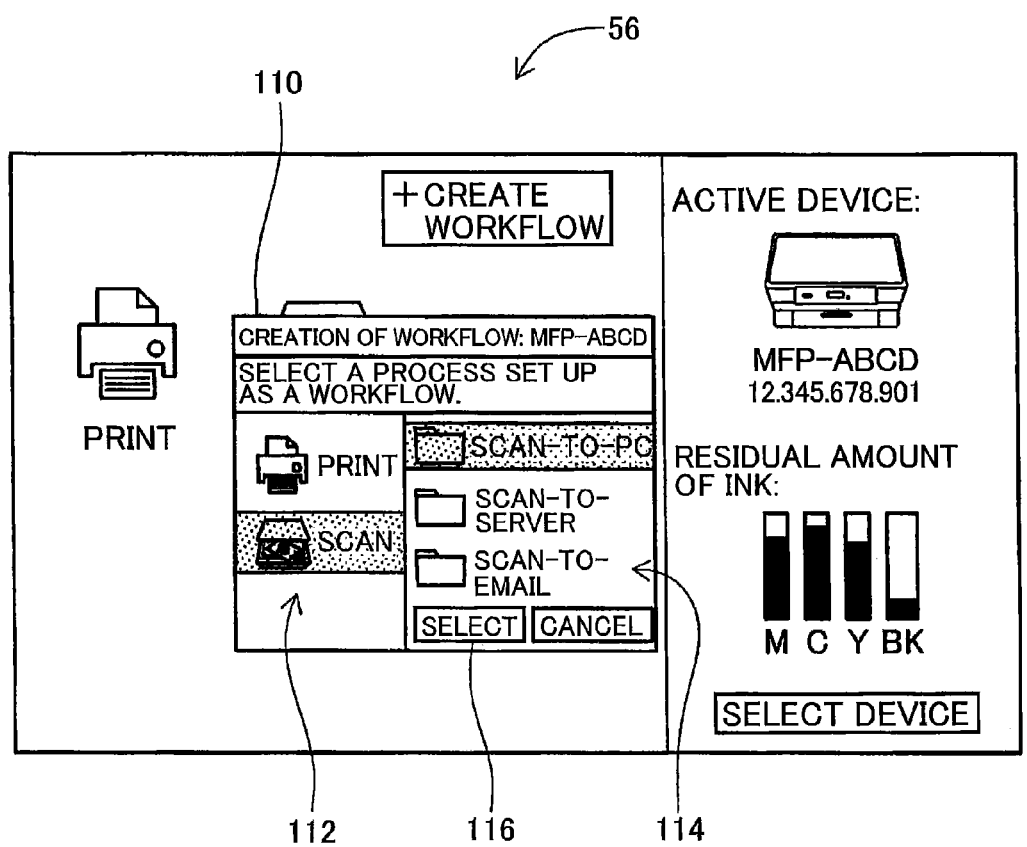
FIG. 4 shows an example of a process selection screen displayed on the display of the PC.
Figure 12:
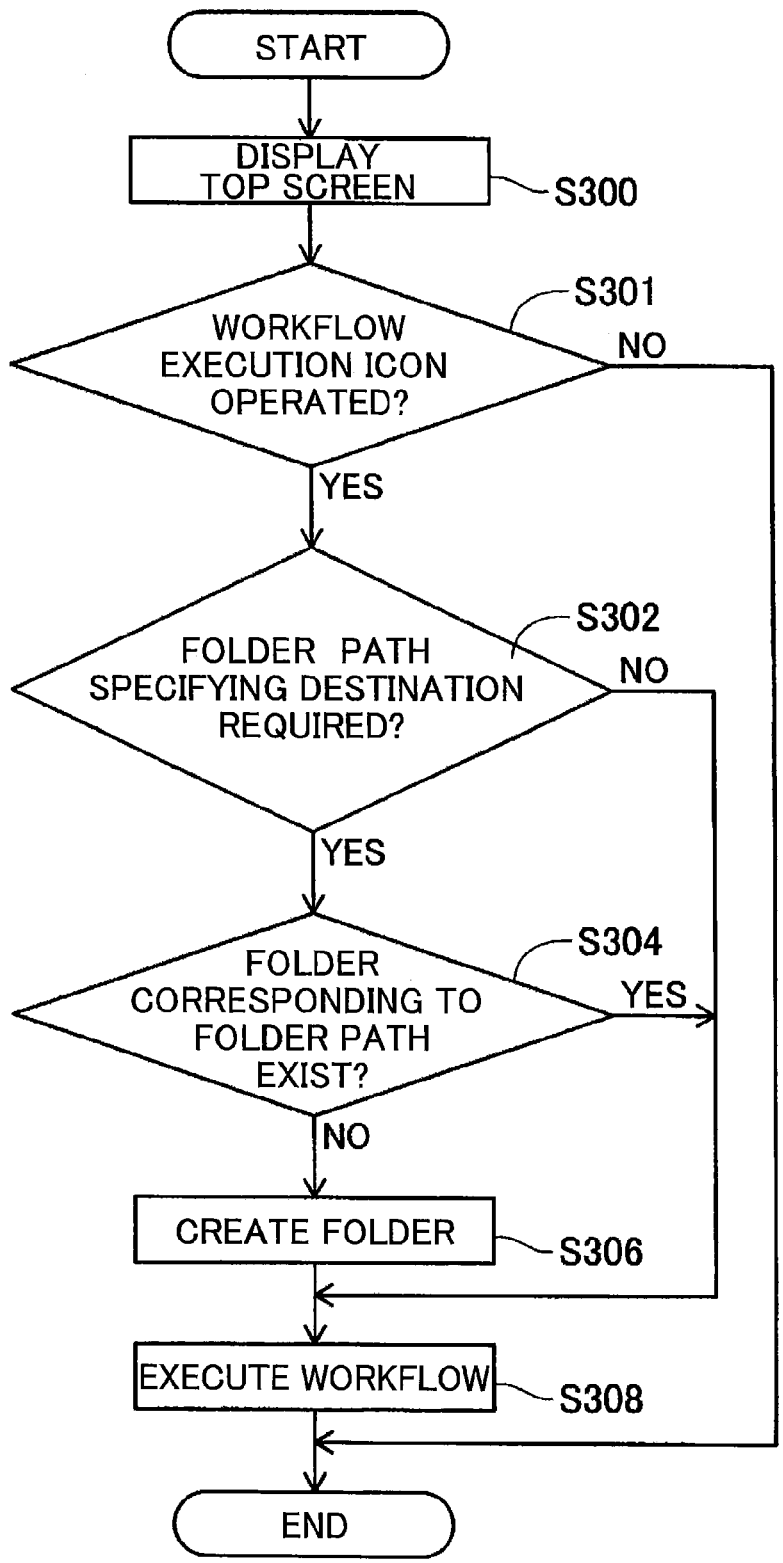
FIG. 12 is a flowchart illustrating steps in a process executed on a PC during execution of a workflow.

By executing the control program 30 on the PC 10, the CPU 12 also displays the top screen 100 shown in FIG. 3 on the display 16 in S300 of FIG. 12. Thus, after storing the workflow data in the data storage area 32, the CPU 12 displays an icon corresponding to the workflow data, i.e., the workflow execution icon, in the top screen 100. In S301 the CPU 12 determines whether the workflow execution icon was selected. If the workflow execution icon has not been selected, the CPU 12 ends the process of FIG. 12.

However, when the workflow execution icon has been selected (S301: YES), in S302 the CPU 12 determines whether the workflow to be executed when the workflow execution icon is operated is a workflow requiring a folder path specifying the location for saving data. Specifically, the CPU 12 determines whether the "INPUT PATH" has been set in the setting condition information of the acquisition process information included in the workflow data, i.e., whether information specifying a file path or the like for a specific file has been set. Here, the workflow requires a file path when the "INPUT PATH" has been set and does not require a file path when the "INPUT PATH" has not been set.

If the workflow to be executed when the workflow execution icon is operated requires a folder path specifying a destination for saving data (S302: YES), in S304 the CPU 12 determines whether the folder corresponding to the folder path exists on the PC 10. In other words, the CPU 12 determines whether the PC 10 has a folder corresponding to the folder path that is set in the setting condition information of the acquisition process information included in the workflow data. If the folder corresponding to the folder path does not exist (S304: NO), in S306 the CPU 12 creates a folder based on this folder path. In S308 the CPU 12 executes the workflow and subsequently ends the process in FIG. 12. Further, when the workflow to be executed when the workflow execution icon is selected does not require a folder path specifying the destination for saving data (S302: NO) or when a folder corresponding to the folder path exists (S304: YES), in S308 the CPU 12 executes the workflow and subsequently ends the process of FIG. 12.

When executing the workflow, the CPU 12 uses the acquisition process information to acquire target data and uses the output process information to output the acquired data. More specifically, when the process identified by the workflow process identification information in the workflow data is the scanning process, the CPU 12 executes a scanning process based on the setting condition information in the acquisition process information, and transmits a command to the selected device instructing the device to transmit the scan data created in the scanning process to the PC 10. At this time, the CPU 12 transmits a command to the selected device using the IP address of the device information included in the workflow data. When the CPU 12 receives scan data from the selected device, the CPU 12 outputs this scan data to an output destination corresponding to the setting condition information in the output process information. That is, when the setting condition information in the output process information is "OUTPUT PATH," the CPU 12 stores the scan data in a folder corresponding to the folder path set in the setting condition information. Through this procedure, the CPU 12 executes a Scan-to-PC process. Alternatively, if the setting condition information in the output process information is "CLOUD INFORMATION," the CPU 12 transmits the scan data to the server 86 having the domain set in the setting condition information. In this way, the CPU 12 can execute the Scan-to-Server process. If the setting condition information in the output process information is "MAILER INFORMATION," the CPU 12 transmits the scan data to the address set in the setting condition information. In this way, the CPU 12 can execute a Scan-to-Email process.

Alternatively, when the process identified by the workflow process identification information included in the workflow data is the printing process, the CPU 12 acquires image data for printing based on the setting condition information in the acquisition process information. In other words, when the setting condition information in the acquisition process information is "INPUT PATH," the CPU 12 acquires image data to be printed from the folder at the folder path set in the setting condition information. Alternatively, when the setting condition information in the acquisition process information is "CLOUD INFORMATION," the CPU 12 acquires image data to be printed from the server 86 based on the domain set in the setting condition information. After acquiring the image data to be printed, the CPU 12 transmits a command to the selected device instructing the device to print an image based on the image data to be printed according to the setting condition information in the output process information. Here, the CPU 12 transmits a command to the selected device using the IP address of the device information included in the workflow data. Through this procedure, the CPU 12 executes either a local printing process or a cloud printing process.

In the communication system 1 having the configuration described above, the PC 50 creates workflow data and transmits this data to the PC 10, and the PC 10 executes a workflow based on the workflow data. Thus, workflow data created on one terminal device is shared with another terminal device. Accordingly, the other terminal device can execute a workflow without creating workflow data, thereby improving user convenience.

Further, when the device driver required for executing a workflow based on workflow data received by the PC 10 is not installed on the PC 10, the PC 10 installs the device driver upon receiving the workflow data. Further, when a terminal device is sharing workflow data with a PC or other terminal device, the terminal device need not consider whether the required device driver is installed on the terminal device with which the workflow data is being shared. In other words, a terminal device can share workflow data without regard for the operating environment of the target terminal device.

Further, the workflow data being shared includes restriction flags that can restrict a terminal device from installing a device driver upon receiving the workflow data. Accordingly, workflow data can be shared in an environment that restricts installation of device drivers.

Further, when a workflow based on workflow data received by the PC 10 requires a folder path specifying the destination for saving data, the PC 10 creates a folder corresponding to the folder path prior to executing the workflow. In this way, workflow data can be shared with a terminal device, even though the folder specified as the destination for saving data has not been created on the terminal device.

The device information in workflow data received by the PC 10 includes capability information for the selected device. Accordingly, the PC 10 can modify the setting condition information in the acquisition process information or the output process information included in the workflow data based on this capability information. More specifically, by executing the control program 30 on the PC 10 in S320 of FIG. 13 the CPU 12 identifies capability information from device information in the received workflow data. In S322 the CPU 12 creates a setting modification screen (not shown) based on the identified capability information and displays this setting modification screen on the display 16. The setting modification screen enables the user to modify setting conditions for processes performed by the selected device, such as scanning conditions and printing conditions, to values within the capability ranges indicated by the capability information.

After the user has modified setting conditions for processes performed by the selected device in the setting modification screen, in S324 the CPU 12 creates workflow data based on the modified conditions (as an example of the claimed second workflow data). Specifically, the CPU 12 modifies the setting condition information in the acquisition process information or output process information to the conditions modified in the setting modification screen. The device information in the workflow data is also applied to the newly created workflow data. In other words, the workflow data created in S324 is modified to data having at least acquisition process information or output process information including the setting condition information modified in the setting modification screen, and the device information included in the workflow data received from the PC 50. In S326 the CPU 12 records the workflow data created in S324 in the data storage area 32, and subsequently ends the process of FIG. 13.

In this way, the PC 10 can modify printing conditions, scanning conditions, and the like set in the setting condition information of workflow data received from the PC 50 and can modify the workflow data to create new workflow data customized for the user of the PC 10.

The PC 10 may also create desired workflow data in the same manner as the PC 50. That is, the PC 10 can display the top screen 100, process selection screen 110, and the like on the display 16 and can create desired workflow data based on prescribed user input in the screens. By executing the control program 30 in this case, the PC 10 implements the flowchart shown in FIG. 2 and creates desired workflow data. Since the process in FIG. 2 was described earlier, a description of this process will not be repeated here. However, when the user sets the PC 78 as the destination for workflow data in the destination selection screen (not shown), the PC 10 transmits the created workflow data to the PC 78 in S114 of FIG. 2.

While the description has been made in detail with reference to specific embodiment, it would be apparent to those skilled in the art that many modifications and variations may be made therein without departing from the spirit of the disclosure, the scope of which is defined by the attached claims. Specifically, an IP address was employed in the present embodiment as the claimed communication information for communicating with the MFP 80 and other devices. However, other information may be used as the clamed communication information, such as a node name, a USB port when the device is connected to the terminal device through a USB port, or Bluetooth discrete ID information when the device is connected to the terminal device using Bluetooth (registered trademark of Bluetooth SIG, Inc.).

Further, installation of a device driver was triggered by the reception of workflow data in the present embodiment, but may instead be triggered by the user selecting the workflow execution icon. Further, creation of a folder in the embodiment was triggered by the user selecting the workflow execution icon, but may instead be triggered by reception of workflow data.

In the present embodiment, the PC 10 acquires a device driver from an arbitrary website and installs the device driver when workflow data is received, but the description is not limited to this configuration. For example, if the device driver is already stored on the PC 10 but is not installed, the PC 10 may simply install the device driver upon receiving workflow data.

In the embodiment described above, the workflow data created on the PC 10 or PC 50 is transmitted to another terminal device, but the workflow data may simply be recorded on the terminal device that created the data rather than being transmitted to another terminal device.

Figure 13:
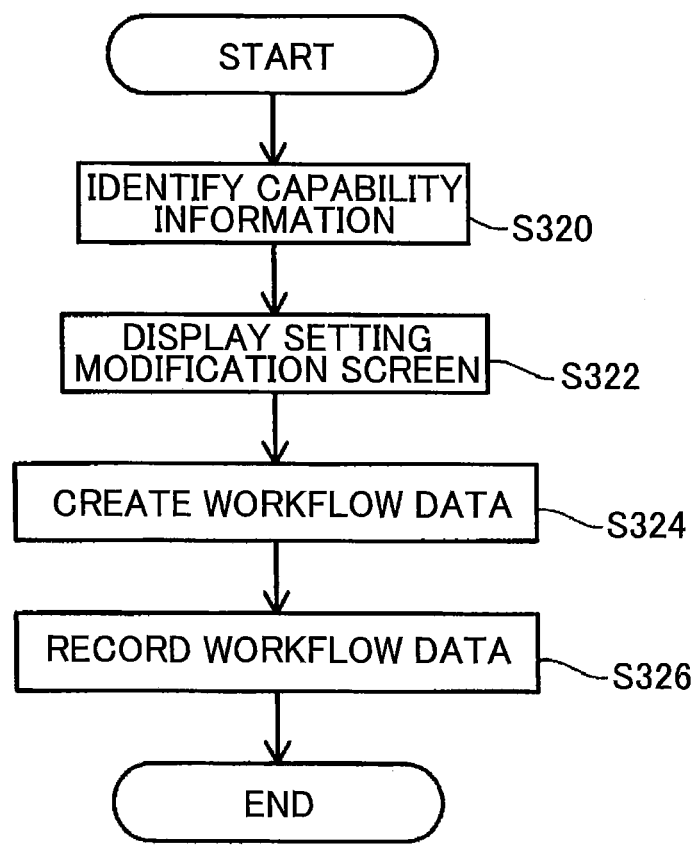
FIG. 13 is a flowchart illustrating steps in a process executed on the PC during modification of workflow data.

While the present embodiment describes a case in which the CPU 12 and the like execute the processes shown in FIGS. 2, 9, and 13, these processes may be implemented by an ASIC or other logic integrated circuit rather than the CPU 12 and the like, or may be executed by a combination of CPUs, ASICs, and other logic integrated circuits.

What is claimed is:

1. A non-transitory computer readable storage medium storing a set of program instructions for a first terminal device including a display, the set of program instructions, when executed by a computer provided in the first terminal device, causing the first terminal device to perform:
- receiving first workflow data from a second terminal device different from the first terminal device, the first workflow data including communication information and first process identification information, the communication information being used for communication with a target device different from the first terminal device and the second terminal device, the first process identification information identifying a first process including an acquisition process for acquiring data to be processed and an output process for outputting the data acquired in the acquisition process;
- displaying an object corresponding to the first workflow data on the display;
- receiving a user operation to the object; and
- in response to the user operation to the object, executing the first process using the communication information and the first process identification information included in the first workflow data,
- wherein the target device is configured to execute at least one of the acquisition process and the output process, and
- wherein the executing includes transmitting, to the device, a command instructing execution of the at least one of the acquisition process and the output process using the communication information.

2. The non-transitory computer readable storage medium according to claim 1, wherein the set of program instructions, when executed by the computer provided in the first terminal device, causes the first terminal device to further perform:
- in response to the first workflow data, determining whether a preliminary process is required before executing the first process; and
- in response to determining that the preliminary process is required, executing the preliminary process.

3. The non-transitory computer readable storage medium according to claim 2, wherein the determining includes determining whether specific software required for executing the first process is installed on the first terminal device; and
- wherein the preliminary process includes a process to install the specific software on the first terminal device.

4. The non-transitory computer readable storage medium according to claim 3, wherein the first workflow data further includes model identification information identifying a model of the target device;
- wherein the set of program instructions, when executed by the computer provided in the first terminal device, causes the first terminal device to further perform identifying the model of the target device according to the model identification information; and
- wherein the preliminary process includes a process to install the specific software corresponding to the model of the target device on the first terminal device.

5. The non-transitory computer readable storage medium according to claim 2, wherein when area identification information identifying a specific storage area is required for executing the first process, the determining includes determining whether the specific storage area exists in the first terminal device; and
- wherein the preliminary process includes a process to create the specific storage area in the first terminal device.

6. The non-transitory computer readable storage medium according to claim 2, wherein when the first workflow data includes restriction information for restricting the preliminary process from being executed, the executing the preliminary process is bypassed even when the determining determines that the preliminary process is required.

7. The non-transitory computer readable storage medium according to claim 2, wherein the determining is triggered by reception of either one of the first workflow data and the user operation to the object.

8. The non-transitory computer readable storage medium according to claim 1, wherein the first workflow data further includes setting information indicating settings used for the first process; and
- wherein the executing includes executing the first process according to the settings indicated by the setting information.

9. The non-transitory computer readable storage medium according to claim 1, wherein the communication information includes at least one of an IP address, a node name, a USB port, and Bluetooth discrete identification information of the target device.

10. The non-transitory computer readable storage medium according to claim 1, wherein the target device is configured to execute a plurality of processes including the at least one of the acquisition process and the output process,
- wherein the first workflow data further includes capability information of the target device, the capability information indicating a plurality of capability ranges corresponding to the plurality of processes respectively; and
- wherein the set of program instructions, when executed by the computer provided in the first terminal device, causes the first terminal device to further perform creating second workflow data including the communication information and second process identification information, the communication information being included in the first workflow data received from the second terminal device, the second process identification information identifying a second process executable within corresponding one of the plurality of capability ranges.

11. The non-transitory computer readable storage medium according to claim 1, wherein the set of program instructions, when executed by the computer provided in the first terminal device, causes the first terminal device to further perform:
- creating second workflow data including the communication information and second process identification information, the second process identification information identifying a second process different from the first process; and
- transmitting the second workflow data to a third terminal device.

12. The non-transitory computer readable storage medium according to claim 1, wherein the target device can execute at least a scanning process in which scan data is created and saved on a destination;
- wherein when the first process identification information identifies the scanning process as the first process and identifies the destination:
  - the acquisition process includes a process in which the target device creates the scan data and transmits the scan data to the first terminal device using the communication information; and
  - the output process includes a process in which the first terminal device transmits the scan data acquired in the acquisition process to the destination identified by the first process identification information.

13. The non-transitory computer readable storage medium according to claim 1, wherein the target device can execute a printing process based on image data;
  wherein when the first process identification information identifies the printing process as the first process and identifies a storage on which the image data to be printed is stored:
    the acquisition process includes a process in which the first device acquires the image data from the storage identified by the first process identification information; and
    the output process includes a process in which the first device transmits the image data acquired in the acquisition process to the target device using the communication information and the target device executes the printing process based on the image data.

14. The non-transitory computer readable storage medium according to claim 1, wherein the object includes an icon image.

15. The non-transitory computer readable storage medium according to claim 1, wherein the object includes a character string.

16. A workflow execution method for executing a workflow by a first terminal device, the workflow corresponding to workflow data created by a second terminal device different from the first terminal device, the first terminal device including a display, the workflow execution method comprising:
  transmitting the workflow data from the second terminal device to the first terminal device, the workflow data including communication information and process identification information, the communication information being used for communication with a target device different from the first terminal device and the second terminal device, the process identification information identifying a prescribed process including an acquisition process for acquiring data to be processed and an output process for outputting data based on the data acquired in the acquisition process;
  receiving the workflow data by the first terminal device;
  displaying an object corresponding to the workflow data on the display,
  receiving a user operation to the object; and
  in response to the user operation to the object, executing the predetermined process using the communication information and the process identification information included in the workflow data,
  wherein the target device is configured to execute at least one of the acquisition process and the output process, and
  wherein the executing includes a transmitting, to the target device, a command instructing execution of the at least one of the acquisition process and the output process using the communication information.

17. A terminal device comprising:
  a display;
  a processor; and
  a memory storing a set of computer-readable instructions therein, the set of computer-readable instructions, when executed by the processor, causing the terminal device to perform:
    receiving workflow data from another terminal device different from the terminal device, the workflow data including communication information and process identification information, the communication information being used for communication with a target device different from the terminal device and the another terminal device, the process identification information identifying a prescribed process including an acquisition process for acquiring data to be processed and an output process for outputting data based on the data acquired in the acquisition process;
    displaying an object corresponding to the workflow data on the display;
    receiving a user operation to the object; and
    in response to the user operation to the object, executing the predetermined process using the communication information and the process identification information included in the workflow data,
  wherein the target device is configured to execute at least one of the acquisition process and the output process, and
  wherein the executing includes a transmitting, to the target device, a command instructing execution of the at least one of the acquisition process and the output process using the communication information.

* * * * *